(12) United States Patent
Sugiyama

(10) Patent No.: US 12,025,866 B2
(45) Date of Patent: Jul. 2, 2024

(54) OPTICAL DEVICE AND OPTICAL COMMUNICATION APPARATUS

(71) Applicant: FUJITSU OPTICAL COMPONENTS LIMITED, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 202 days.

(21) Appl. No.: 17/862,903

(22) Filed: Jul. 12, 2022

(65) Prior Publication Data

US 2023/0056833 A1    Feb. 23, 2023

(30) Foreign Application Priority Data

Aug. 23, 2021    (JP) ................. 2021-135930

(51) Int. Cl.
    *G02F 1/035*     (2006.01)
    *G02F 1/21*     (2006.01)
    *G02F 1/225*     (2006.01)

(52) U.S. Cl.
    CPC ............ *G02F 1/0356* (2013.01); *G02F 1/212* (2021.01); *G02F 1/2255* (2013.01)

(58) Field of Classification Search
    CPC ............................. G02F 1/212; G02F 1/0356
    See application file for complete search history.

(56) References Cited

U.S. PATENT DOCUMENTS

| 5,479,552 | A | * | 12/1995 | Kitamura | ................ G02F 1/035 385/16 |
| 2003/0133637 | A1 | * | 7/2003 | Bao | ........................ G02B 6/132 385/129 |
| 2013/0170781 | A1 | | 7/2013 | Kissa et al. | |
| 2020/0272020 | A1 | | 8/2020 | Ohmori et al. | |

FOREIGN PATENT DOCUMENTS

| CN | 112162446 A | * | 1/2021 |
| JP | 2014175421 A | * | 9/2014 |
| JP | 2020-134875 | | 8/2020 |

OTHER PUBLICATIONS

Overview of "Gettering", various ScienceDirect publications 1996-2016 (Year: 2016).*

* cited by examiner

*Primary Examiner* — Charlie Y Peng
(74) *Attorney, Agent, or Firm* — STAAS & HALSEY LLP

(57) ABSTRACT

An optical device includes an optical waveguide that is a rib type and that is formed of a thin film lithium niobate ($LiNbO_3$: LN) substrate using a thin film LN crystal, and a buffer layer that is laminated on the optical waveguide. Furthermore, the optical device includes an electrode that is laminated on the buffer layer and that applies a voltage to the optical waveguide, and a gettering site that is disposed parallel to the optical waveguide and that traps an electric charge inside the optical waveguide.

11 Claims, 11 Drawing Sheets

OPTICAL DEVICE AND OPTICAL COMMUNICATION APPARATUS

CROSS-REFERENCE TO RELATED APPLICATION

This application is based upon and claims the benefit of priority of the prior Japanese Patent Application No. 2021-135930, filed on Aug. 23, 2021, the entire contents of which are incorporated herein by reference.

FIELD

The embodiments discussed herein are related to an optical device and an optical communication apparatus.

BACKGROUND

A conventional optical modulator is constituted by, for example, an optical waveguide that is disposed on a substrate, and a modulating unit that is disposed in the vicinity of the optical waveguide. The modulating unit includes a signal electrode and a ground electrode, and, if a voltage is applied to the signal electrode, an electric field is produced in an interior of the optical waveguide, the refractive index of the optical waveguide varies due to the electric field in the interior of the optical waveguide, and thus, the phase of light is changed. The optical waveguide constitutes a Mach-Zehnder interferometer, and an output level of light is changed due to a difference of the phase of light between the optical waveguides.

In the optical modulator, for example, four channel Mach-Zehnder modulators are integrated. Each of the Mach-Zehnder interferometers includes a radio frequency (RF) modulating unit and a direct current (DC) modulating unit. The electrode of the RF modulating unit receives an input of a high frequency signal having a band of, for example, several tens of gigahertz (GHz) and performs high-speed modulation. Furthermore, at the electrode of the DC modulating unit, a bias voltage is applied, and a bias voltage is adjusted such that ON/OFF of the electrical signal is associated with ON/OFF of the optical signal.

The optical waveguide included in the optical modulator constitutes, for example, a Mach-Zehnder interferometer, and outputs IQ signals that are subjected to XY polarization division multiplexing on the basis of phase differences of the light between a plurality of optical waveguides that are disposed in parallel. Then, the optical waveguide multiplexes the output of four channels every two channels to form two IQ signals, performs polarization rotation on one of the two IQ signals, performs polarization multiplexing by using a polarization beam combiner, and outputs the multiplexed signal.

In contrast, as the optical waveguide, there is a diffusion optical waveguide that is formed at a position that does not overlap with a position of the signal electrode by spreading, for example, metals, such as titanium, from the surface of a substrate. FIG. 11 is a schematic cross-sectional view illustrating an example of a DC modulating unit 100 included in a conventional optical modulator. The DC modulating unit 100 included in the optical modulator illustrated in FIG. 11 includes a LN substrate 101 that is formed of Lithium Niobate (LiNbO$_3$: LN) crystal, and a diffusion optical waveguide 102 that is formed on the surface of the LN substrate 101. In addition, the DC modulating unit 100 includes a buffer layer 103 that covers the diffusion optical waveguide 102 disposed on the LN substrate 101, and an electrode 104 that is laminated on the buffer layer 103. The electrode 104 includes a signal electrode 104A and a pair of ground electrodes 104B.

The diffusion optical waveguide 102 is usually disposed at a position that does not overlap with the position of each of the signal electrode 104A and the pair of the ground electrodes 104B. The composition and the film thickness of the buffer layer 103 is determined so as to have a low resistance value in order to suppress a DC drift (a temporal change in emission light occurring caused by an applied bias voltage). In addition, in the LN substrate 101, of course, positive and negative movable electric charges are present inside the LN crystal, and, in addition, movable electric charges are produced at the process of forming the optical modulator.

However, the diffusion optical waveguide 102 weakly confines light, so that application efficiency of the electric field is not good, and thus, a drive voltage becomes high. Accordingly, there is a thin film optical waveguide that is formed at a position in which the optical waveguide formed by using a LN crystal thin film does not overlap with the signal electrode. The thin film optical waveguide is able to confine light more strongly as compared to when a diffusion optical waveguide that diffuses metal is used, so that thin film optical waveguide is able to improve the application efficiency of the electric field decrease a drive voltage.

FIG. 12 is a schematic cross-sectional view illustrating an example of a DC modulating unit 200 included in the conventional optical modulator. The DC modulating unit 200 illustrated in FIG. 12 includes a support substrate 201 that is made of silicon (Si) or the like, and an intermediate layer 202 that is laminated on the support substrate 201. Furthermore, the DC modulating unit 200 includes a thin film LN substrate 203 laminated on the intermediate layer 202, and a buffer layer 204 that is laminated on the thin film LN substrate 203 and that is made of SiO$_2$.

The thin film LN substrate 203 is a thin film optical waveguide 206 that has a convex shape and that protrudes upward. The thin film optical waveguide 206 is a rib type waveguide that includes a rib 206A and slabs 206B that are formed on both sides of the rib 206A. In addition, the rib 206A and the slabs 206B are covered by the buffer layer 204, and a signal electrode 205A (205) and a pair of ground electrodes 205B (205) that have a coplanar waveguide (CPW) structure are disposed on the surface of the buffer layer 204. In other words, on the buffer layer 204, the signal electrode 205A and the pair of the ground electrodes 205B that sandwich the signal electrode 205A are disposed. In addition, the buffer layer 204 is able to prevent the light propagating through the thin film optical waveguide 206 from being absorbed at the signal electrode 205A and the ground electrodes 205B.

The thin film optical waveguides 206 each having a convex shape are formed on the thin film LN substrate 203 located at a position between the signal electrode 205A and each of the ground electrodes 205B. Furthermore, step portions 204A each of which covers the entirety of the thin film optical waveguide 206 having the convex shape is also disposed on the buffer layer 204 located at a position between the signal electrode 205A and each of the ground electrodes 205B.

The thin film optical waveguide 206 described above is able to modulate light propagating through the thin film optical waveguide 206 by producing an electric field by applying a bias voltage to the signal electrode 205A and by changing the refractive index of the thin film optical waveguide 206.

Patent Document 1: Japanese Laid-open Patent Publication No. 2020-134875

Patent Document 2: U.S. Patent No. 2013/170781

However, in the optical modulator, if the LN substrate is formed to be a thin film, density of the movable electric charge that is present in the LN crystal becomes high and easily affects the thin film optical waveguide 206, so that the electric field present in the thin film optical waveguide 206 becomes unstable. As a result, for example, in a case of the DC modulating unit, the DC characteristics are unstable, so that a DC drift is induced and the life of the optical device is shortened.

SUMMARY

According to an aspect of an embodiment, an optical device includes an optical waveguide, a buffer layer, an electrode and a gettering site. The optical waveguide is a rib type and is formed of a thin film lithium niobate ($LiNbO_3$: LN) substrate using a thin film LN crystal. The buffer layer is laminated on the optical waveguide. The electrode is laminated on the buffer layer and applies a voltage to the optical waveguide. The gettering site is disposed parallel to the optical waveguide and traps an electric charge inside the optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
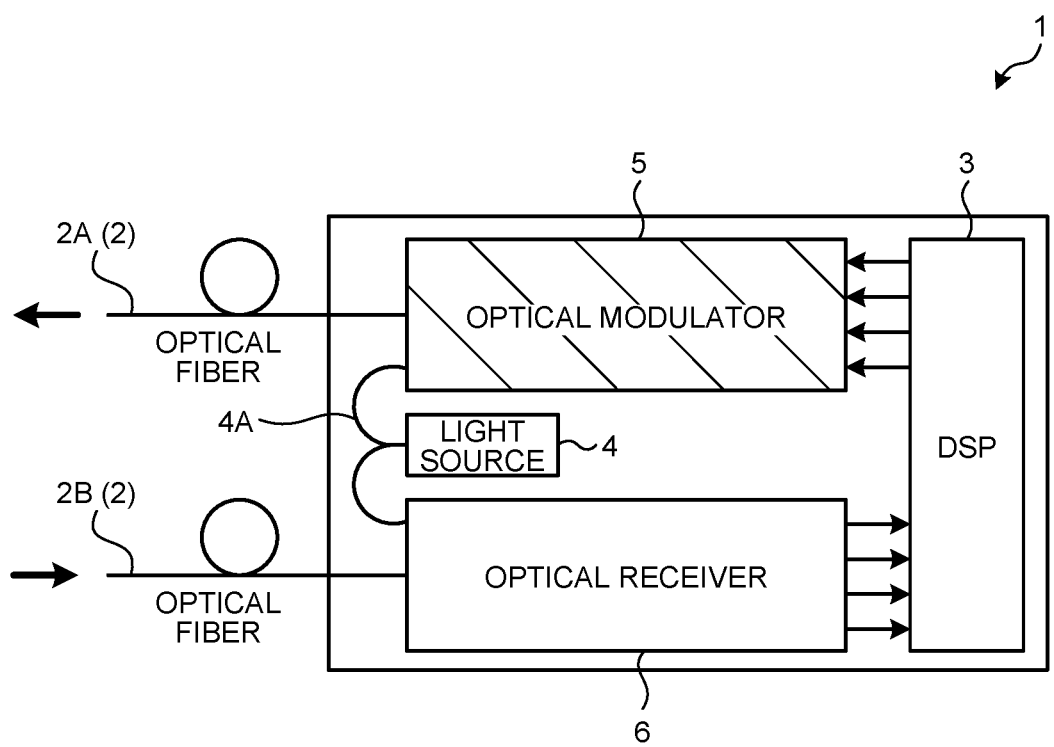
FIG. 1 is a block diagram illustrating an example of a configuration of an optical communication apparatus according to a first embodiment.

FIG. 1 is a block diagram illustrating an example of a configuration of an optical communication apparatus 1 according to a first embodiment. The optical communication apparatus 1 illustrated in FIG. 1 is connected to an optical fiber 2A (2) disposed on the output side and an optical fiber 2B (2) disposed on the input side. The optical communication apparatus 1 includes a digital signal processor (DSP) 3, a light source 4, an optical modulator 5, and an optical receiver 6. The DSP 3 is an electrical component that executes digital signal processing. The DSP 3 executes a process of, for example, encoding or the like on transmission data, generates an electrical signal that includes the transmission data, and outputs the generated electrical signal to the optical modulator 5. Furthermore, the DSP 3 acquires an electrical signal including reception data from the optical receiver 6 and obtains reception data by executing a process of decoding or the like on the acquired electrical signal.

The light source 4 includes, for example, a laser diode or the like, generates light with a predetermined wavelength, and supplies the generated light to the optical modulator 5 and the optical receiver 6. The optical modulator 5 is an optical device that modulates, by using the electrical signal that is output from the DSP 3, the light supplied from the light source 4 and that outputs the obtained optical transmission signal to the optical fiber 2A. The optical modulator 5 is an optical device, such as an LN optical modulator, that includes, for example, a lithium niobate ($LiNbO_3$: LN) optical waveguide and a modulating unit. The LN optical waveguide is formed of a LN crystal substrate. The optical modulator 5 generates an optical transmission signal by modulating, when light supplied from the light source 4 propagates through the LN optical waveguide, the light by the electrical signal that is input to the modulating unit.

The optical receiver 6 receives an optical signal from the optical fiber 2B and demodulates the received optical signal by using the light supplied from the light source 4. Then, the optical receiver 6 converts the demodulated received optical signal to an electrical signal, and then, outputs the converted electrical signal to the DSP 3.

Figure 2:
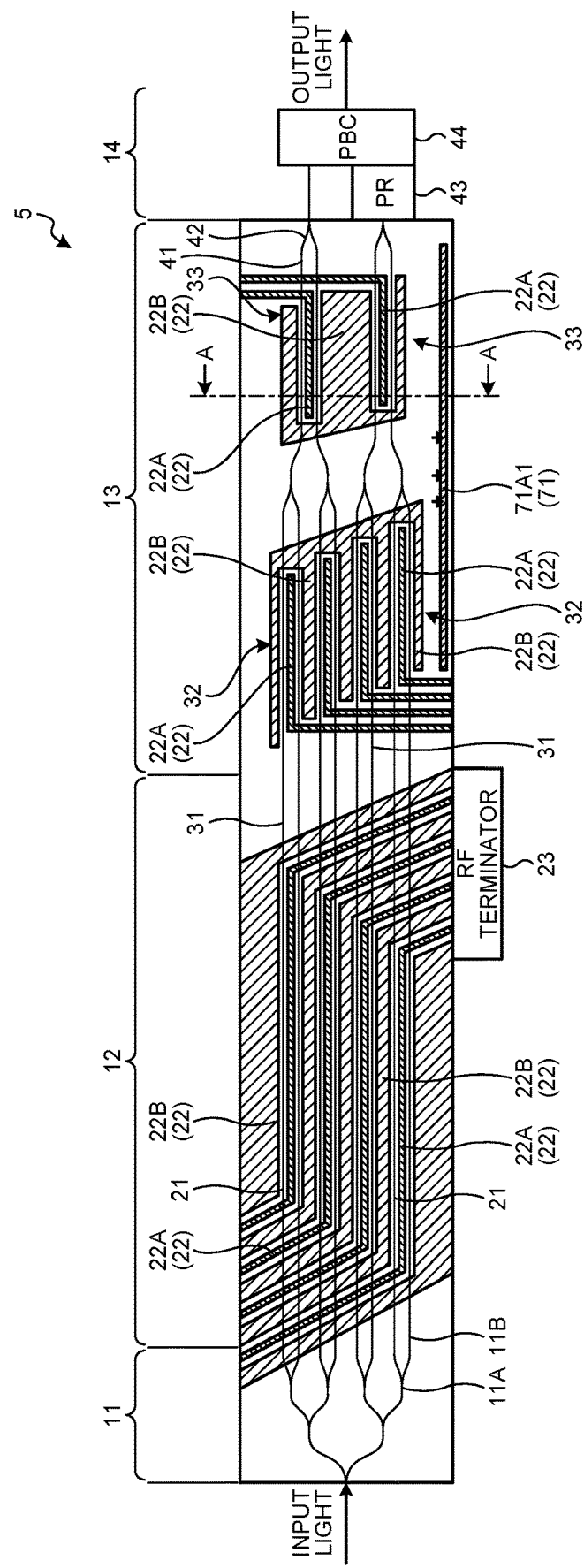
FIG. 2 is a schematic plan view illustrating an example of a configuration of an optical modulator according to the first embodiment.

FIG. 2 is a schematic plan view illustrating an example of a configuration of the optical modulator 5 according to the first embodiment. The optical modulator 5 illustrated in FIG. 2 has a configuration in which an optical fiber 4A connected from the light source 4 is connected to the input side of the optical modulator 5 and the optical fiber 2A that is used to output a transmission signal is connected to the output side of the optical modulator 5. The optical modulator 5 includes a first optical input unit 11, a radio frequency (RF) modulating unit 12, a direct current (DC) modulating unit 13, and a first optical output unit 14. The first optical input unit 11 is a LN optical waveguide that includes a first optical waveguide 11A and a first waveguide joining unit 11B. The first optical waveguide 11A includes a single optical waveguide that is connected to the optical fiber 4A, two optical waveguides that are branched off from the single optical waveguide, four optical waveguides that are branched off from the associated two optical waveguides, and eight optical waveguides that are branched off from the associated four optical waveguides. The first waveguide joining unit 11B joins a portion between the eight optical waveguides included in the first optical waveguide 11A and the respective eight LN optical waveguides included in the LN optical waveguide 21.

The RF modulating unit 12 includes the LN optical waveguide 21, an electrode 22, and a RF terminator 23. When the light supplied from the first optical waveguide 11A propagates through the LN optical waveguide 21, the RF modulating unit 12 modulates the propagating light by using an electric field applied by a signal electrode 22A included in the electrode 22. The LN optical waveguide 21 is an optical waveguide with a rib type that is formed by using, for example, a thin film LN substrate 53, and has eight parallel LN optical waveguides that are formed by being repeatedly branched off from the input side. The light that has been modulated while propagating through the LN optical waveguide 21 is output to a first DC modulating unit 32 included in the DC modulating unit 13. The thin film LN substrate 53 has spontaneous polarization characteristics in a Z direction of the crystal axis of the LN crystal, so that the thin film LN substrate 53 has an internal electric field in the interior of the thin film LN crystal.

The signal electrode 22A included in the electrode 22 is disposed at a position that does not overlap with the position of the LN optical waveguide 21, and applies an electric field to the LN optical waveguide 21 in accordance with the electrical signal that is output from the DSP 3. The termination of the signal electrode 22A included in the electrode 22 is connected to the RF terminator 23. The RF terminator 23 is connected to the termination of the signal electrode 22A and prevents unneeded reflection of a signal that is transmitted by the signal electrode 22A.

The DC modulating unit 13 includes a LN optical waveguide 31 that is joined to the LN optical waveguide 21 included in the RF modulating unit 12, the first DC modulating unit 32, a second DC modulating unit 33, and a gettering site 71. The first DC modulating unit 32 is constituted by four child side Mach-Zehnder (MZ) interferometers. The second DC modulating unit 33 is constituted by two parent side MZ interferometers. The first DC modulating unit 32 includes the LN optical waveguide 31 and the electrode 22. The LN optical waveguide 31 is an optical waveguide with a rib type formed by using, for example, the thin film LN substrate 53. Furthermore, the thin film LN substrate 53 is formed to have a thin film shape, so that the density of the movable electric charge remaining in the thin film LN substrate 53 is high. The thin film LN substrate 53 has spontaneous polarization characteristics in the Z direction of the crystal axis of the LN crystal, so that an internal electric field is held in the interior of the thin film LN crystal.

A gettering site 71A (71) is formed of a material including, for example, polysilicon having the gettering action. The gettering site 71A is constituted by forming a film at a position that is outside the plurality of the LN optical waveguides 31 and in which the LN optical waveguides 31 are disposed in parallel to the gettering site 71A. The gettering site 71A traps, by way of a buffer layer 54, the movable electric charge that remains in the interior of the thin film LN substrate 53. Specifically, for example, a resistance value of the thin film LN crystal is decreased in accordance with a temperature increase caused by a heat treatment performed prior to shipment from a factory, and thus, the movable electric charge remaining inside the thin film LN substrate 53 drifts in the internal electric field caused by the spontaneous polarization of the thin film LN crystal. Then, the gettering site 71A accordingly traps, by way of the buffer layer 54, the movable electric charge remaining inside the thin film LN substrate 53 due to the drift of the movable electric charge that is placed in the internal electric field. As a result, the movable electric charge is removed from a rib 60A included in a thin film optical waveguide 60 corresponding to the thin film LN substrate 53.

The LN optical waveguide 31 includes eight LN optical waveguides, and four LN optical waveguides that merge with the two LN optical waveguides out of the eight LN optical waveguides. The eight LN optical waveguides 31 have a configuration in which the first DC modulating unit 32 is disposed at an intervals of two LN optical waveguides. By applying a bias voltage to the signal electrode 22A formed on the LN optical waveguide 31, the first DC modulating unit 32 adjusts the bias voltage such that ON/OFF of the electrical signal is associated with ON/OFF of the optical signal, and then, outputs an I signal having an in-phase axis component or outputs a Q signal having an orthogonal axis component. The four LN optical waveguides included in the LN optical waveguide 31 have a configuration in which the second DC modulating unit 33 is disposed at intervals of two LN optical waveguides. By applying a bias voltage to the signal electrode 22A formed on the LN optical waveguide 31, the second DC modulating unit 33 adjusts the bias voltage such that ON/OFF of the electrical signal is associated with ON/OFF of the optical signal, and then, outputs the I signal or the Q signal.

The gettering site 71A traps, by way of the buffer layer 54, the positive and negative movable electric charges remaining inside the thin film LN substrate 53 due to a drift of the movable electric charge that is placed in the internal electric field of the thin film LN crystal. As a result, the positive and negative movable electric charges are removed from the rib 60A included in the thin film optical waveguide 60 corresponding to the thin film LN substrate 53.

The first optical output unit 14 includes a second waveguide joining unit 41, a second optical waveguide 42, a polarization rotator (PR) 43, and a polarization beam combiner (PBC) 44. The second waveguide joining unit 41 joins a portion between the LN optical waveguide 31 and the second optical waveguide 42 included in the DC modulating unit 13. The second optical waveguide 42 is a LN optical waveguide that includes four optical waveguides connected to the second waveguide joining unit 41 and also includes two optical waveguides that merge with the two optical waveguides out of the four optical waveguides.

The PR 43 rotates the I signal or the Q signal that is input from one of the second DC modulating units 33 by 90 degrees and obtains a vertical polarization optical signal that has been rotated by 90 degrees. Then, the PR 43 inputs the vertical polarization optical signal to the PBC 44. The PBC 44 multiplexes the vertical polarization optical signal that is input from the PR 43 and a horizontal polarization optical signal that is input from the other of the second DC modulating unit 33, and then, outputs a polarization division multiplexing signal.

Figure 3:
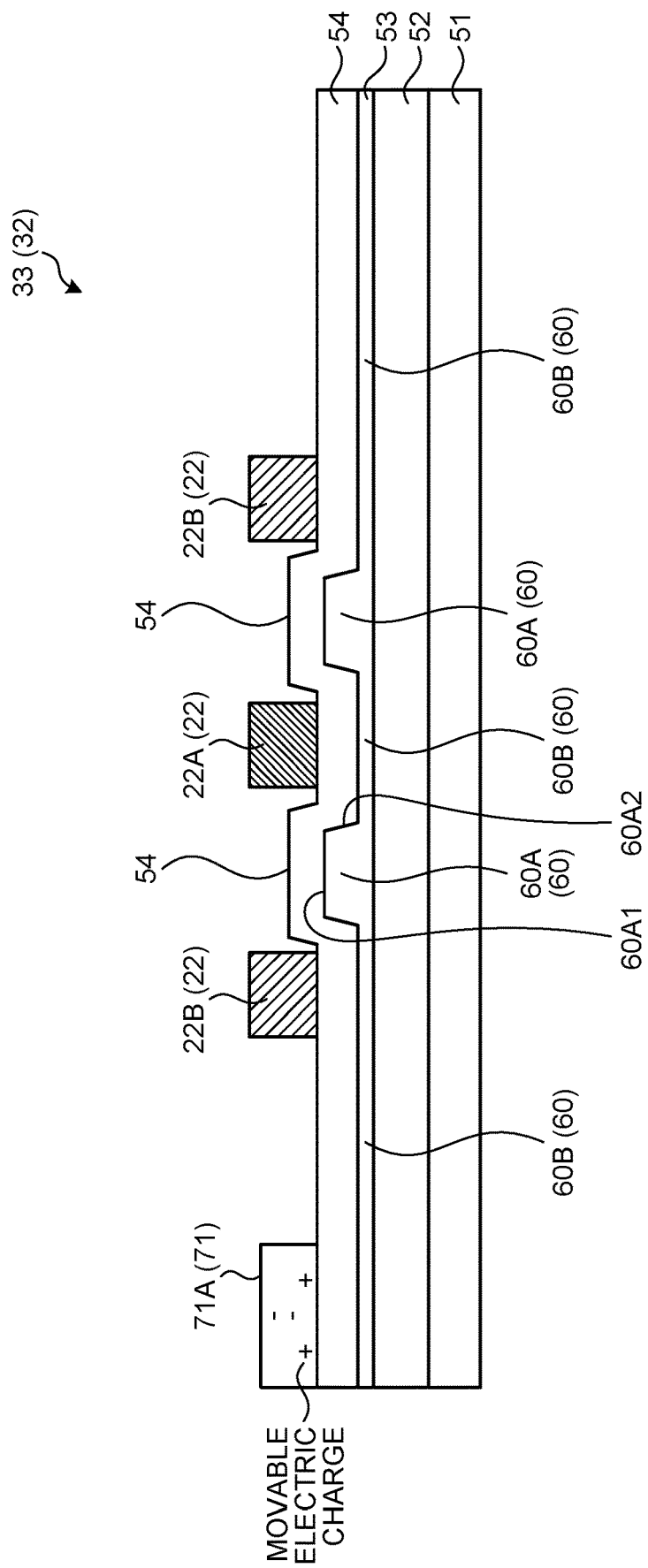
FIG. 3 is a schematic cross-sectional view taken along line A-A of a second DC modulating unit illustrated as an example and included in the optical modulator according to the first embodiment.

In the following, a configuration of the optical modulator 5 according to the first embodiment will be specifically described. FIG. 3 is a schematic cross-sectional view taken along line A-A of the second DC modulating unit 33 included in the optical modulator 5 according to the first embodiment. In addition, for convenience of description, FIG. 2 illustrates a case, as an example, in which the second DC modulating unit 33 is constituted by two MZ interferometers; however, in a schematic cross-sectional view illustrated in FIG. 3, a description will be made by using a single piece of MZ interferometer. Furthermore, similarly, a case has been described above as an example in which the first DC modulating unit 32 is also constituted by four MZ interferometers; however, the configuration of the first DC modulating unit 32 is the same as that of the second DC modulating unit 33 in units of MZ interferometers, so that, by assigning the same reference numerals to components having the same configuration, overlapping descriptions of the configuration and the operation thereof will be omitted. The second DC modulating unit 33 illustrated in FIG. 3 includes a support substrate 51 and an intermediate layer 52 that is laminated on the support substrate 51. Furthermore, the second DC modulating unit 33 includes the thin film LN substrate 53 that is laminated on the intermediate layer 52 and that is a thin film LN crystal, the buffer layer 54 that is laminated on the thin film LN substrate 53, the electrode 22, and the gettering site 71 (71A). The electrode 22 includes the signal electrode 22A and a pair of ground electrodes 22B.

The gettering site 71A is a gettering site that is formed of a material including, for example, polysilicon. Furthermore, the gettering site 71A may be formed of a material including, for example, silicon nitride instead of polysilicon, and appropriate modifications are possible by changing the material in accordance with the type of the movable electric charge that is targeted for the trap and that remains inside the thin film optical waveguide 60.

The support substrate 51 is a substrate made of, for example, Si, LN, or the like. The intermediate layer 52 is a layer formed of, for example, a transparent member made of, such as $SiO_2$ or $TiO_2$, having a refractive index that is lower than that of LN. Similarly, the buffer layer 54 is a layer formed of, for example, a transparent member made of, such as $SiO_2$ or $TiO_2$, having a refractive index that is lower than that of LN.

The thin film LN substrate 53 is the thin film optical waveguide 60 protruding upward and has a convex shape. The thin film optical waveguide 60 is the LN optical waveguide 31 included in the second DC modulating unit 33. The thin film optical waveguide 60 is an optical waveguide with a rib type having the rib 60A and slabs 60B disposed on both sides of the rib 60A. The rib 60A includes an upper surface 60A1 of the rib 60A and side wall surfaces 60A2 of the rib 60A. Then, the thin film optical waveguide 60 is covered by the buffer layer 54. The buffer layer 54 is provided in order to prevent light propagating through the thin film optical waveguide 60 from being absorbed by the electrode 22.

The buffer layer 54 covers the upper surface 60A1 of the rib 60A included in the thin film optical waveguide 60, and also covers the slab 60B of the thin film optical waveguide 60. The signal electrode 22A and the pair of the ground electrodes 22B are accordingly disposed on the buffer layer 54.

The thin film optical waveguide 60 that is disposed at a position between the signal electrode 22A and the ground electrode 22B is the rib 60A that is included in the thin film optical waveguide 60. The thin film optical waveguide 60 in which the signal electrode 22A and the ground electrode 22B are located is the slab 60B that is included in the thin film optical waveguide 60.

The thin film optical waveguide 60 that corresponds to the thin film LN substrate 53 and that has the thickness of 0.5 to 3 μm is sandwiched between the intermediate layer 52 and the buffer layer 54. The width of the rib 60A corresponding to the thin film optical waveguide 60 is about, for example, 1 to 8 μm.

The signal electrode 22A is an electrode that is formed of, for example, a metal material made of gold, copper, or the like, and that has a width of 2 to 10 μm and a thickness of 1 to 20 μm. The ground electrode 22B is an electrode formed of, for example, a metal material made of gold, copper, or the like, and has a thickness of 1 μm or more. A bias voltage in accordance with the electrical signal that is output from the DSP 3 is applied to the signal electrode 22A, so that an electric field in a direction from the signal electrode 22A toward each of the ground electrodes 22B is generated, and the generated electric field is applied to the thin film optical waveguide 60. As a result, the refractive index of the thin film optical waveguide 60 is changed in accordance with the electric field applied to the thin film optical waveguide 60, and it is thus possible to modulate the light propagating through the thin film optical waveguide 60.

The gettering site 71A included in the second DC modulating unit 33 according to the first embodiment traps, by way of the buffer layer 54, the movable electric charge remaining in the thin film LN crystal included in the thin film LN substrate 53 by a drift of the movable electric charge present inside the thin film LN substrate 53 due to the internal electric field that exists in the thin film LN crystal. The movable electric charge remaining in the rib 60A is removed and the movable electric charge is retained in the gettering site 71A, so that it is possible to stabilize the electric field existing inside the thin film optical waveguide 60. As a result, it is possible to stabilize the DC characteristics and prevent an occurrence of a DC drift. In addition, it is possible to extend the life of the second DC modulating unit 33.

The gettering site 71A included in the first DC modulating unit 32 traps, by way of the buffer layer 54, the movable electric charge remaining in the thin film LN crystal included in the thin film LN substrate 53 by a drift of the movable electric charge that is present inside the thin film LN substrate 53 due to the internal electric field existing inside the thin film LN crystal. The movable electric charge remaining in the rib 60A is removed and the movable electric charge is retained in the gettering site 71A, so that it is possible to stabilize the electric field existing inside the thin film optical waveguide 60. As a result, it is possible to stabilize the DC characteristics and prevent an occurrence of a DC drift. In addition, it is possible to extend the life of the first DC modulating unit 32.

In addition, for convenience of description, a case has been described as an example in which, for example, the movable electric charge remaining inside the thin film LN substrate 53 is trapped by a drift of the movable electric charge that is present inside the thin film LN substrate 53 due to the internal electric field existing inside the thin film LN crystal produced by a heat treatment performed prior to shipment from a factory. However, instead of the heat treatment, the movable electric charge remaining inside the thin film LN substrate 53 may be trapped in accordance with electric conduction with respect to the gettering site 71A, and appropriate modifications are possible. In this case, there is no need to rely on the drift of the movable electric charge that is present inside the thin film LN substrate 53 due to the internal electric field existing inside the thin film LN crystal; however, in the case where a drift of the movable electric charge that is present inside the thin film LN substrate 53 due to the internal electric field is used, it is possible to further improve the trap efficiency of the movable electric charge.

Furthermore, the electric conduction with respect to the gettering site 71A is not limited to the timing of, for example, prior to shipment from a factory or the like. The electric conduction with respect to the gettering site 71A may also be performed in accordance with electric conduction with respect to the electrode 22 that is being operated after the gettering site 71A and the electrode 22 are electrically connected. As a result, the gettering site 71A may also trap the movable electric charge that is present inside the thin film optical waveguide 60 during the operation.

In addition, in the first embodiment, a case has been described as an example in which the DC modulating unit 13 is applied; however, the case may also be applied to the RF modulating unit 12.

In the second DC modulating unit 33 according to the first embodiment, a case has been described as an example in which the gettering site 71 is disposed on the outer side of the plurality of the electrode 22 such that the gettering site 71 is parallel to the electrode 22. However, the gettering site 71 may be disposed so as to be sandwiched by both sides of the plurality of the electrode 22, and an embodiment thereof will be described as a second embodiment.

[b] Second Embodiment

Figure 4:
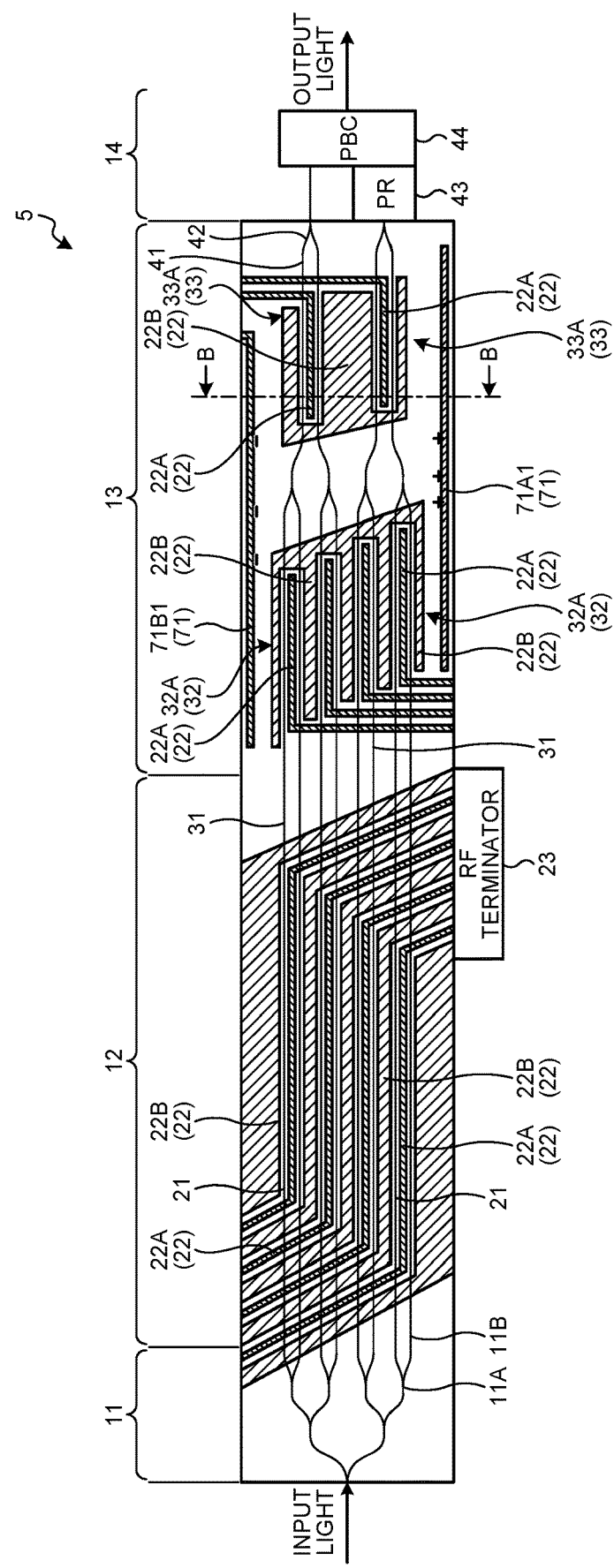
FIG. 4 is a schematic plan view illustrating an example of a configuration of an optical modulator according to a second embodiment.
Figure 5:
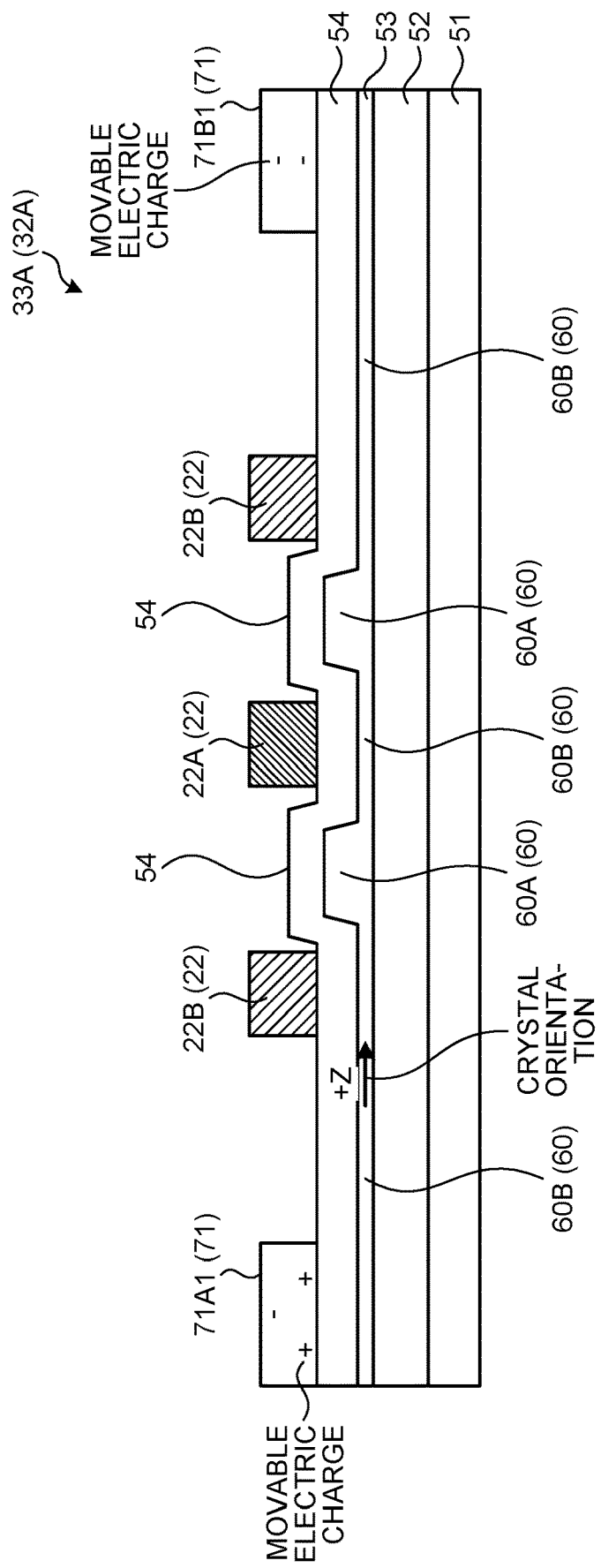
FIG. 5 is a schematic cross-sectional view taken along line B-B of a second DC modulating unit illustrated as an example and included in the optical modulator according to the second embodiment.

FIG. 4 is a schematic plan view illustrating an example of a configuration of the optical modulator 5 according to the second embodiment, and FIG. 5 is a schematic cross-sectional view taken along line B-B of a second DC modulating unit 33A included in the optical modulator 5 according to the second embodiment illustrated as an example. Furthermore, for convenience of description, FIG. 4 illustrates, an example, a case in which the second DC modulating unit 33A is constituted by two MZ interferometers; however, a description will be made by using a single piece of MZ interferometer by using a schematic cross-sectional view illustrated in FIG. 5. Furthermore, similarly, FIG. 4 illustrates, as an example, a case in which a first DC modulating unit 32A is constituted by four MZ interferometers; however, the configuration of the first DC modulating unit 32A is the same as that of the second DC modulating unit 33A in units of MZ interferometers, so that, by assigning the same reference numerals to components having the same configuration, overlapping descriptions of the configuration and the operation thereof will be omitted. The second DC modulating unit 33A illustrated in FIG. 4 is different from the second DC modulating unit 33 illustrated in FIG. 3 in that the two gettering sites 71 are disposed in parallel so as to sandwich both sides of the plurality of the electrodes 22.

The gettering site 71 includes a first gettering site 71A1 and a second gettering site 71B1. The first gettering site 71A1 traps, by way of the buffer layer 54, the movable electric charge on the positive side remaining inside the thin film LN substrate 53 by a drift of the movable electric charge that is present inside the thin film LN substrate 53 due to the internal electric field existing inside the thin film LN crystal produced by a heat treatment. As a result, the movable electric charge on the positive side is removed from the rib 60A included in the thin film optical waveguide 60 corresponding to the thin film LN substrate 53. The second gettering site 71B1 traps, by way of the buffer layer 54, the movable electric charge that is on the negative side remaining inside the thin film LN substrate 53 by a drift of the movable electric charge that is present inside the thin film LN substrate 53 due to the internal electric field existing inside the thin film LN crystal produced by a heat treatment. As a result, the movable electric charge on the negative side is removed from the rib 60A included in the thin film optical waveguide 60 corresponding to the thin film LN substrate 53.

As described above, the first gettering site 71A1 and the second gettering site 71B1 are disposed in the Z-axis direction in the orientation of the thin film LN crystal with respect to the electrode 22. As a result, the orientation of the electric field is made to the same as that of the internal electric field, so that it is possible to prevent the thin film optical waveguide 60 from being affected by trapping the movable electric charge in the first gettering site 71A1 and the second gettering site 71B1 due to the internal electric field existing inside the LN crystal.

In the first gettering site 71A1 and the second gettering site 71B1 included in the second DC modulating unit 33A, the movable electric charge present inside the thin film LN substrate 53 is drifted due to the internal electric field that exists in the thin film LN crystal produced by a heat treatment. Furthermore, the first gettering site 71A1 and the second gettering site 71B1 traps, by way of the buffer layer 54, the movable electric charge remaining in the thin film LN crystal by a drift of the movable electric charge. The movable electric charge remaining in the rib 60A included in the thin film optical waveguide 60 is retained inside the first gettering site 71A1 and the second gettering site 71B1, so that it is possible to stabilize the electric field that exists in the thin film optical waveguide 60. As a result, it is possible to stabilize the DC characteristics and prevent an occurrence of a DC drift. In addition, it is possible to extend the life of the second DC modulating unit 33A.

The first gettering site 71A1 traps, by way of the buffer layer 54, the movable electric charge on the positive side remaining in the thin film LN crystal. The second gettering site 71B1 traps, by way of the buffer layer 54, the movable electric charge on the negative side remaining in the thin film LN crystal. The movable electric charge remaining in the rib 60A is retained inside the first gettering site 71A1 and the second gettering site 71B1, so that it is possible to stabilize the electric field inside the thin film optical waveguide 60.

In the first gettering site 71A1 and the second gettering site 71B1 included in the first DC modulating unit 32A, the movable electric charge present inside the thin film LN substrate 53 is drifted due to the internal electric field that exists in the thin film LN crystal produced by a heat treatment. Furthermore, the first gettering site 71A1 and the second gettering site 71B1 traps, by way of the buffer layer 54, the movable electric charge remaining in the thin film LN crystal by a drift of the movable electric charge. The movable electric charge remaining in the rib 60A included in the thin film optical waveguide 60 is retained inside the first gettering site 71A1 and the second gettering site 71B1, so that it is possible to stabilize the electric field that exists in the thin film optical waveguide 60. As a result, it is possible to stabilize the DC characteristics and prevent an occurrence of a DC drift. In addition, it is possible to extend the life of the first DC modulating unit 32A.

In the optical modulator 5, if a plurality of MZ interferometers are disposed in parallel, the first gettering site 71A1 and the second gettering site 71B1 are disposed on an outer side of the plurality of MZ interferometers. As a result, in the optical modulator 5, it is possible to stabilize the electric field of the thin film optical waveguide 60 corresponding to the plurality of MZ interferometers.

In addition, in the second embodiment, a case has been described as an example in which the embodiment is applied to the DC modulating unit 13; however, the embodiment is also applied to the RF modulating unit 12.

In addition, a case has been described as an example in which the first gettering site 71A1 and the second gettering site 71B1 included in the second DC modulating unit 33A according to the second embodiment are laminated on the buffer layer 54. However, a behavior at the time of operation of the gettering site 71 is more stable in a case in which the gettering site 71 is disposed away from the electrode 22; however, if the gettering site 71 is disposed too far away from the electrode 22, the electric field inside the thin film optical waveguide 60 is weak at the time of a trap of the movable electric charge. As a result, the movable electric charge is not sufficiently trapped, and it takes time to trap the movable electric charge. Accordingly, for example, an opening portion 72 is formed, in the buffer layer 54 and the thin film LN substrate 53, at the position in which the first gettering site 71A1 and the second gettering site 71B1 are disposed. Furthermore, the first gettering site 71A1 and the second gettering site 71B1 may be laminated inside the opening portion 72, and an embodiment thereof will be described as a third embodiment.

[c] Third Embodiment

Figure 6:
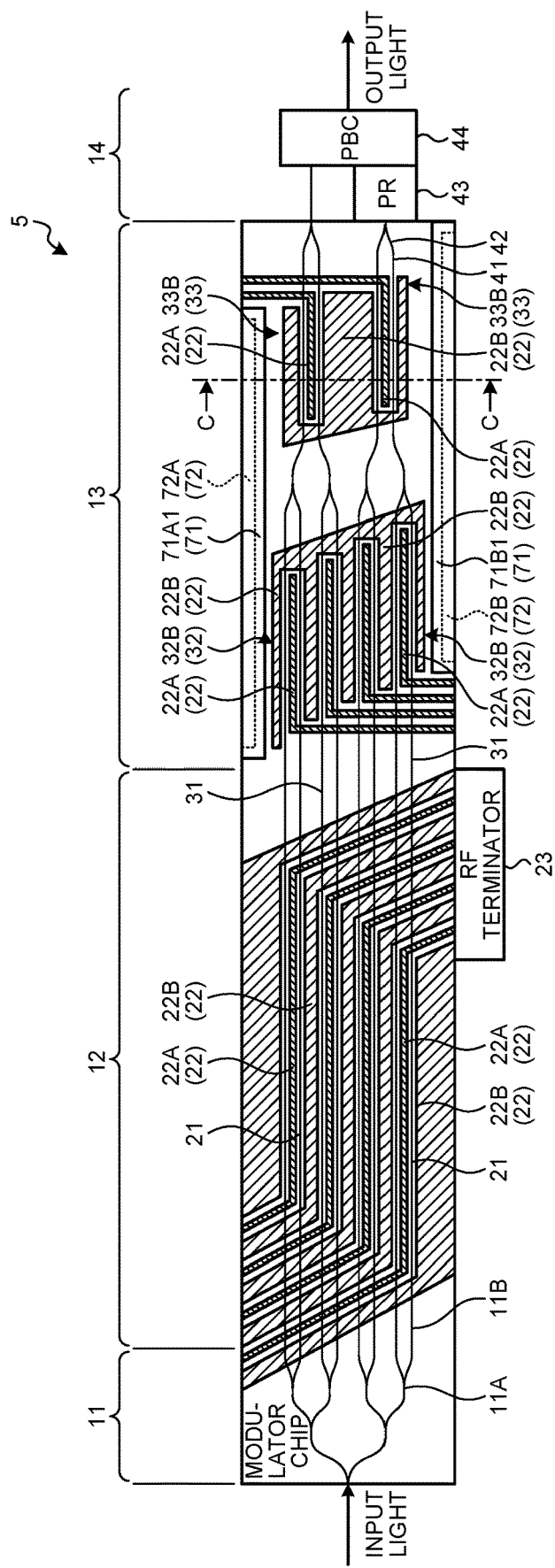
FIG. 6 is a schematic plan view illustrating an example of a configuration of an optical modulator according to a third embodiment.

FIG. 6 is a schematic cross-sectional view taken along line C-C of a second DC modulating unit 33B included in the optical modulator 5 according to the third embodiment. Furthermore, by assigning the same reference numerals to components having the same configuration as those in the optical modulator 5 according to the second embodiment, overlapped descriptions of the configuration and the operation thereof will be omitted. The second DC modulating unit 33B illustrated in FIG. 6 is different from the second DC modulating unit 33A illustrated in FIG. 5 in that the opening portion 72 is formed in the buffer layer 54 and the thin film LN substrate 53 at the position in which the first gettering site 71A1 and the second gettering site 71B1 are disposed. In addition, a part of the first gettering site 71A1 and a part of the second gettering site 71B1 are laminated inside the opening portion 72.

The opening portion 72 includes a first opening portion 72A and a second opening portion 72B. The first opening portion 72A is formed in the buffer layer 54, the thin film LN substrate 53 and the intermediate layer 52 at the position in which the first gettering site 71A1 is disposed. A part of the first gettering site 71A1 is laminated on the first opening portion 72A. The second opening portion 72B is formed in the buffer layer 54, the thin film LN substrate 53, and the intermediate layer 52 at the position in which a second gettering site 71B2 is disposed. A part of the second gettering site 71B1 is laminated on the second opening portion 72B.

The first gettering site 71A1 is able to efficiently trap the movable electric charge inside the thin film LN substrate 53 as a result of the first gettering site 71A1 directly coming into contact with the thin film LN substrate 53 via the first opening portion 72A. Furthermore, the second gettering site 71B1 is able to efficiently trap the movable electric charge inside the thin film LN substrate 53 as a result of the second gettering site 71B1 directly coming into contact with the thin film LN substrate 53 via the second opening portion 72B.

In the second DC modulating unit 33B according to the third embodiment, a part of the first gettering site 71A1 and a part of the second gettering site 71B1 are directly brought into contact with the thin film LN substrate 53 by the opening portion 72. As a result, the first gettering site 71A1 and the second gettering site 71B1 are able to efficiently trap the movable electric charge present inside the thin film LN substrate 53. In addition, it is possible to reduce the time needed to trap the movable electric charge.

In a first DC modulating unit 32B, a part of the first gettering site 71A1 and a part of the second gettering site 71B1 are directly brought into contact with the thin film LN substrate 53 by the opening portion 72. As a result, the first gettering site 71A1 and the second gettering site 71B1 are able to efficiently trap the movable electric charge present inside the thin film LN substrate 53. In addition, it is possible to reduce the time needed to trap the movable electric charge.

Furthermore, in the third embodiment, a case has been described as an example in which the embodiment is applied to the DC modulating unit 13; however, the embodiment may also be applied to the RF modulating unit 12.

In the second DC modulating unit 33B according to the third embodiment, a case has been described as an example in which, by laminating the gettering site 71A in the opening portion 72, the gettering site 71 and the thin film LN substrate 53 are directly brought into contact with each other. In order to increase a contact area in which the gettering site 71 and the thin film LN substrate 53 formed in the opening portion 72 are directly brought into contact with each other, the thickness of the thin film LN substrate 53 that is brought into contact with the gettering site 71 may be set to have substantially the same thickness as the rib 60A, and an embodiment thereof will be described below as a fourth embodiment.

[d] Fourth Embodiment

Figure 7:
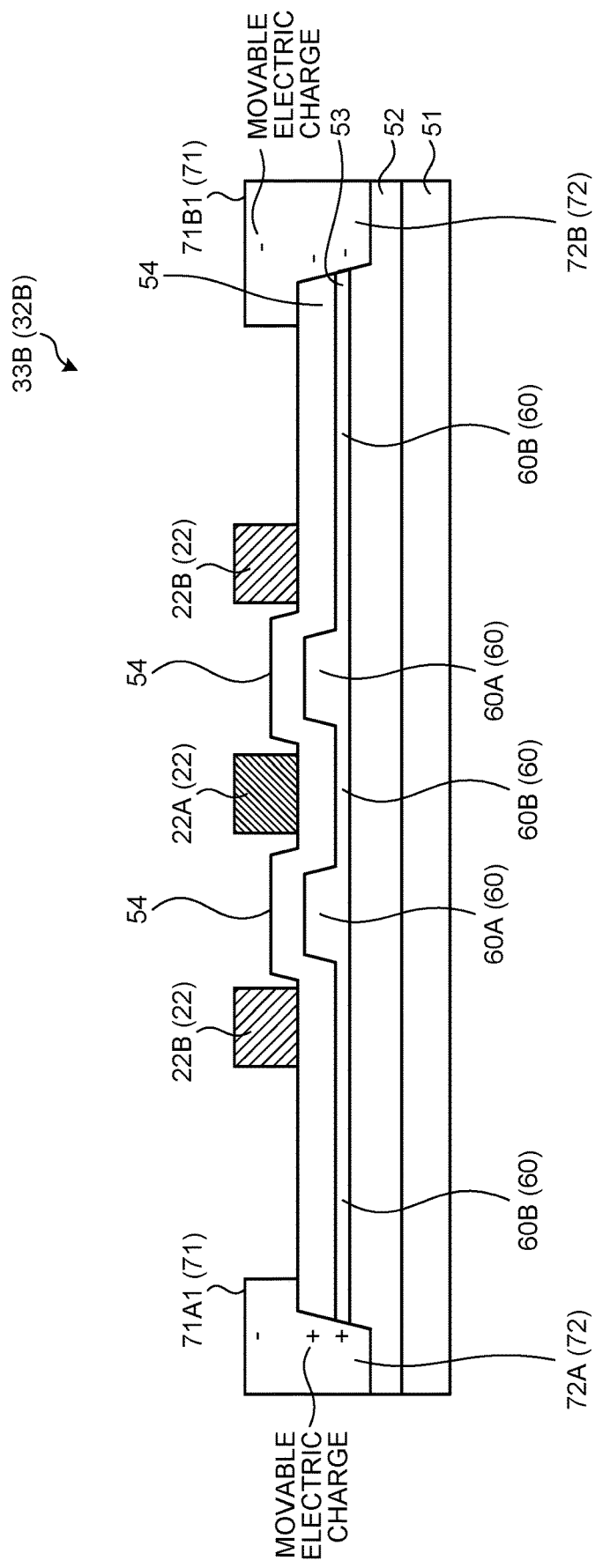
FIG. 7 is a schematic cross-sectional view taken along line C-C of a second DC modulating unit illustrated as an example and included in the optical modulator according to the third embodiment.
Figure 8:
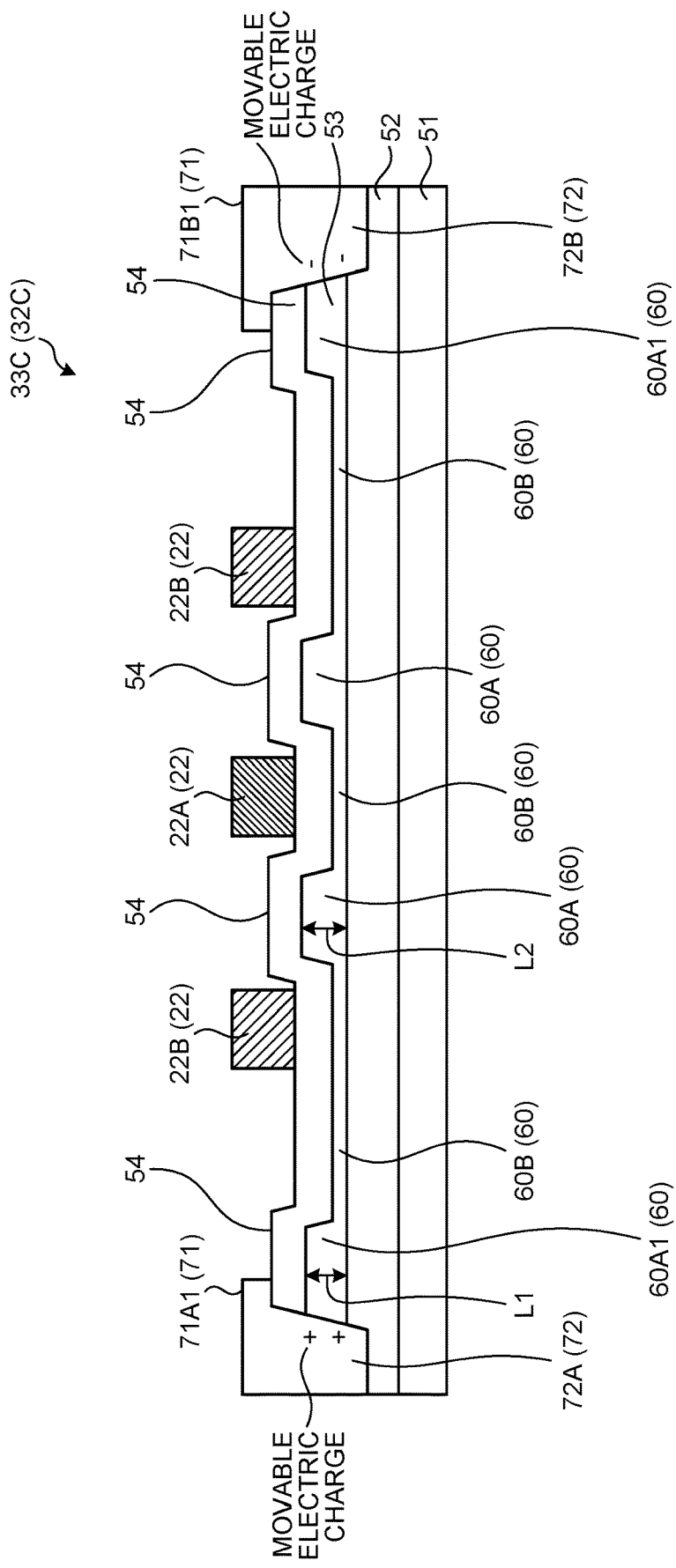
FIG. 8 is a schematic cross-sectional view taken along line C-C of a second DC modulating unit illustrated as an example and included in the optical modulator according to the fourth embodiment.

FIG. 8 is a schematic cross-sectional view taken along line C-C of a second DC modulating unit 33C included in the optical modulator 5 according to the fourth embodiment. Furthermore, by assigning the same reference numerals to components having the same configuration as those in the optical modulator 5 according to the third embodiment, overlapped descriptions of the configuration and the operation thereof will be omitted. The second DC modulating unit 33C illustrated in FIG. 8 is different from the second DC modulating unit 33B illustrated in FIG. 7 in that the structure is constituted such that a thickness L1 of the thin film LN substrate 53 that is brought into contact with the gettering site 71 included in the opening portion 72 is made substantially the same as the thickness L2 of the rib 60A.

The thickness L1 of the thin film LN substrate 53 (60A1) that is brought into contact with the first gettering site 71A1 included in the first opening portion 72A is made substantially the same as the thickness L2 of the rib 60A on the thin film LN substrate 53. As a result, an area in which the first gettering site 71A1 included in the first opening portion 72A that is brought into contact with the thin film LN substrate 53 included in the first opening portion 72A is increased.

The thickness L1 of the thin film LN substrate 53 (60A1) that is brought into contact with the second gettering site 71B1 included in the second opening portion 72B is made substantially the same as the thickness L2 of the rib 60A on the thin film LN substrate 53. As a result, an area in which the second gettering site 71B1 included in the second opening portion 72B is brought into contact with the thin film LN substrate 53 included in the second opening portion 72B is increased.

In the second DC modulating unit 33C, the thickness L1 of the thin film LN substrate 53 (60A1) that is brought into contact with the first gettering site 71A1 included in the first opening portion 72A is made substantially the same as the thickness L2 of the rib 60A. The area in which the first gettering site 71A1 included in the first opening portion 72A is brought into contact with the thin film LN substrate 53 included in the first opening portion 72A is increased. As a result, by further increasing the contact area with the thin film LN substrate 53, the first gettering site 71A1 is able to further improve the trap efficiency of the movable electric charge.

In the second DC modulating unit 33C, the thickness L1 of the thin film LN substrate 53 (60A1) that is brought into contact with the second gettering site 71B1 included in the second opening portion 72B is made substantially the same as the thickness L2 of the rib 60A on the thin film LN substrate 53. The area in which the second gettering site 71B1 included in the second opening portion 72B is brought into contact with the thin film LN substrate 53 included in the second opening portion 72B is made larger. As a result, by further increasing the contact area with the thin film LN substrate 53, the second gettering site 71B1 is able to further improve the trap efficiency of the movable electric charge.

In a first DC modulating unit 32C, the thickness L1 of the thin film LN substrate 53 (60A1) that is brought into contact with the gettering site 71 included in the opening portion 72 is made substantially the same as the thickness L2 of the rib 60A. The area in which the gettering site 71 included in the opening portion 72 is brought into contact with the thin film LN substrate 53 included in the opening portion 72. As a result, by further increasing the contact area with the thin film LN substrate 53, the gettering site 71 is able to further improve the trap efficiency of the movable electric charge.

Furthermore, for convenience of description, the structure in which the thickness L1 of the thin film LN substrate 53 that is brought into contact with the gettering site 71 is substantially the same as the thickness L2 of the rib 60A has been exemplified; however, of course, in addition to L1=L2, appropriate modifications are possible as along as the thickness L1 is greater than the thickness of the slab 60B.

Furthermore, in the fourth embodiment, a case has been described as an example in which the embodiment is applied to the DC modulating unit 13; however, the embodiment may also be applied to the RF modulating unit 12.

In addition, in the optical modulator 5 according to the fourth embodiment, a case has been described as an example in which the first gettering site 71A1 is laminated inside the first opening portion 72A, and the second gettering site 71B1 is laminated inside the second opening portion 72B. However, the example is not limited to this, and an embodiment thereof will be described as a fifth embodiment.

[e] Fifth Embodiment

Figure 9:
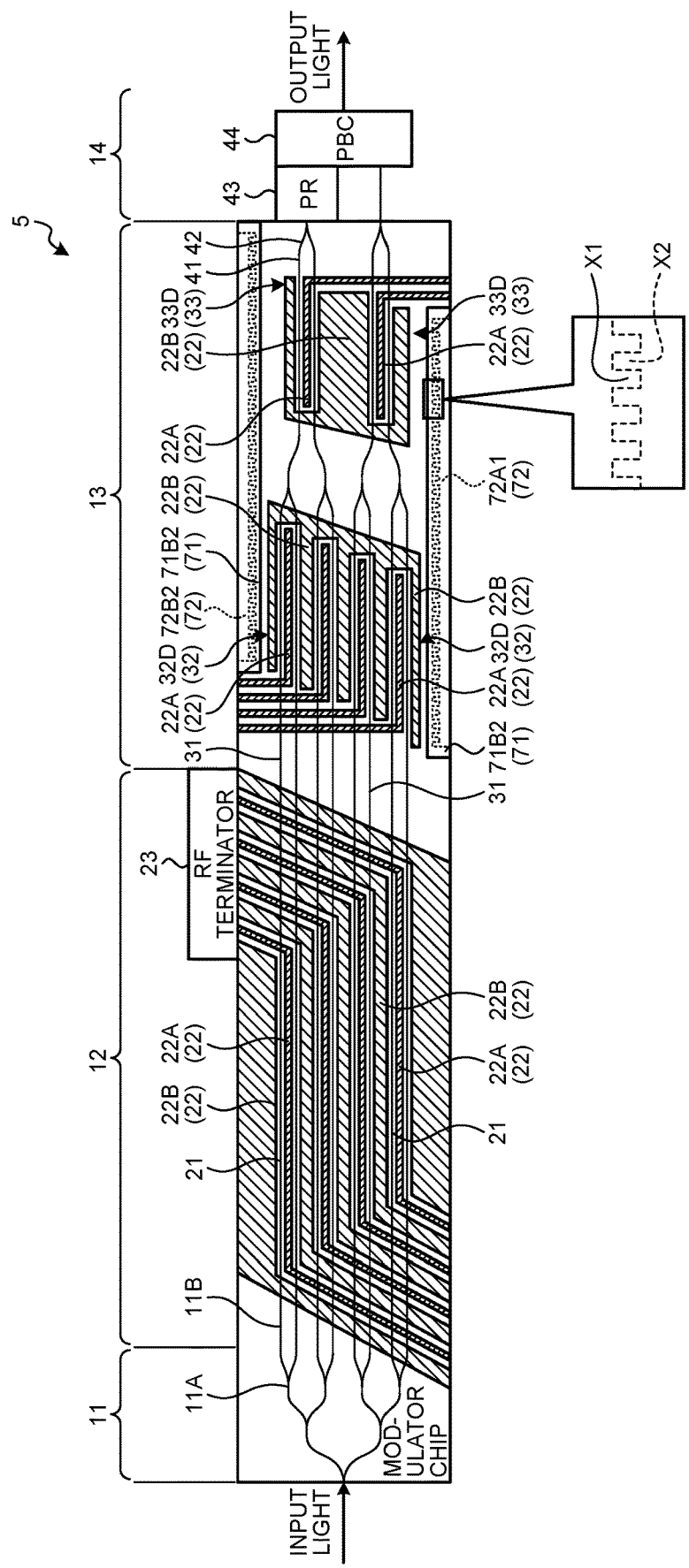
FIG. 9 is a schematic plan view illustrating an example of a configuration of an optical modulator according to a fifth embodiment.

FIG. 9 is a schematic plan view illustrating an example of a configuration of the optical modulator 5 according to the fifth embodiment. Furthermore, by assigning the same reference numerals to components having the same configuration as those in the optical modulator 5 according to the third embodiment, overlapped descriptions of the configuration and the operation thereof will be omitted. A second DC modulating unit 33D illustrated in FIG. 9 is different from the second DC modulating unit 33C illustrated in FIG. 6 in that a first joining unit X1 included in the gettering site 71, and a second joining unit X2 that is formed on the thin film LN substrate 53 and the buffer layer 54 on the opening portion 72 side are formed in a comb tooth shape. Furthermore, the gettering site 71 and the thin film LN substrate 53 are joined by engaging the first joining unit X1 having the comb tooth shape with the second joining unit X2 having the comb tooth shape.

As a result of the first joining unit X1 being engaged with the second joining unit X2, the first gettering site 71A1 is joined with the thin film LN substrate 53 and the buffer layer 54 included in the first opening portion 72A. The first joining unit X1 having the comb tooth shape and the second joining unit X2 having the comb tooth shape are joined by being engaged with each other, so that a contact area between the first gettering site 71A1 and the thin film LN substrate 53 is increased.

As a result of the first joining unit X1 being engaged with the second joining unit X2, the second gettering site 71B1 is joined with the thin film LN substrate 53 and the buffer layer 54 included in the second opening portion 72B. The first joining unit X1 having the comb tooth shape and the second joining unit X2 having the comb tooth shape are joined by being engaged with each other, so that a contact area between the second gettering site 71B1 and the thin film LN substrate 53 is increased.

The first gettering site 71A1 is joined with the thin film LN substrate 53 and the buffer layer 54 included in the first opening portion 72A as a result of the first joining unit X1 having the comb tooth shape being engaged with the second joining unit X2 having the comb tooth shape. In addition, the contact area between the first gettering site 71A1 and the thin film LN substrate 53 is increased. As a result, even if the density of the movable electric charge remaining inside the thin film LN substrate 53 is high, the first gettering site 71A1 is able to further improve the trap efficiency of the movable electric charge by increasing the contact area.

The second gettering site 71B1 is joined with the thin film LN substrate 53 and the buffer layer 54 included in the second opening portion 72B as a result of the first joining unit X1 having the comb tooth shape being engaged with the second joining unit X2 having the comb tooth shape. Then, the contact area located between the second gettering site 71B1 and the thin film LN substrate 53 is increased. As a result, even if the density of the movable electric charge remaining inside the thin film LN substrate 53 is high, the second gettering site 71B1 is able to further improve the trap efficiency of the movable electric charge by increasing the contact area.

Furthermore, in the fifth embodiment, a case has been described as an example in which the embodiment is applied to the second DC modulating unit 33D; however, the embodiment may also be applied to the first DC modulating unit 32D.

In addition, for convenience of description, a case has been described as an example in which the first joining unit X1 and the second joining unit X2 are formed in a comb tooth shape; however, the shape is not limited to the comb tooth shape, but may be a saw tooth shape. If the first joining unit X1 having the saw tooth shape is joined to the second joining unit X2 having the saw tooth shape, the contact area located between the gettering site 71 and the thin film LN substrate 53 is increased. As a result, the gettering site 71 is able to further improve the trap efficiency of the movable electric charge by increasing the contact area.

In addition, a case has been described as an example in which the gettering site 71 is disposed in parallel to the thin film optical waveguide 60 (the electrode 22) included in the DC modulating unit 13 in the optical modulator 5 according to the fifth embodiment. However, the embodiment is not limited to the DC modulating unit 13, but may be applied to the RF modulating unit 12, and an embodiment thereof will be described as a sixth embodiment.

[f] Sixth Embodiment

Figure 10:
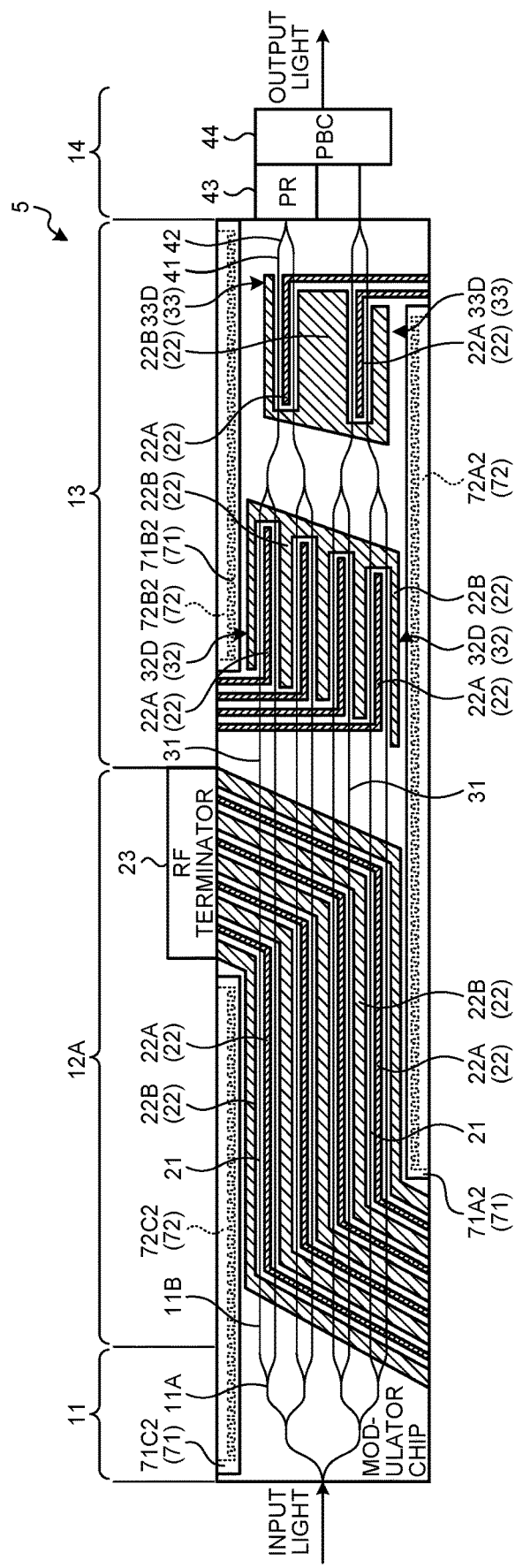
FIG. 10 is a schematic plan view illustrating an example of a configuration of an optical modulator according to a sixth embodiment.
Figure 11:
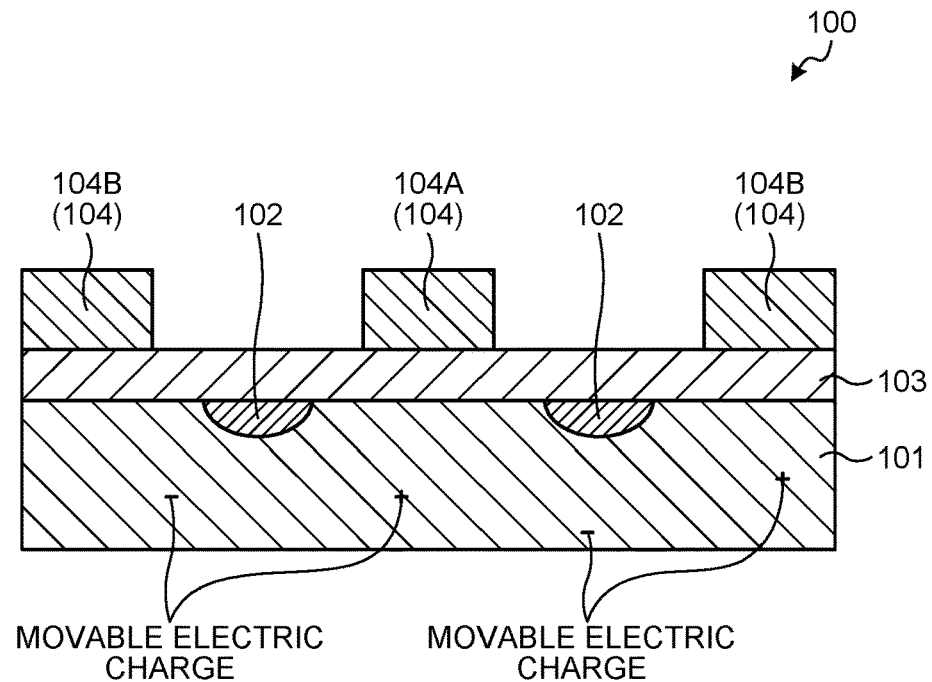
FIG. 11 is a schematic cross-sectional view illustrating an example of a DC modulating unit included in a conventional optical modulator.
Figure 12:
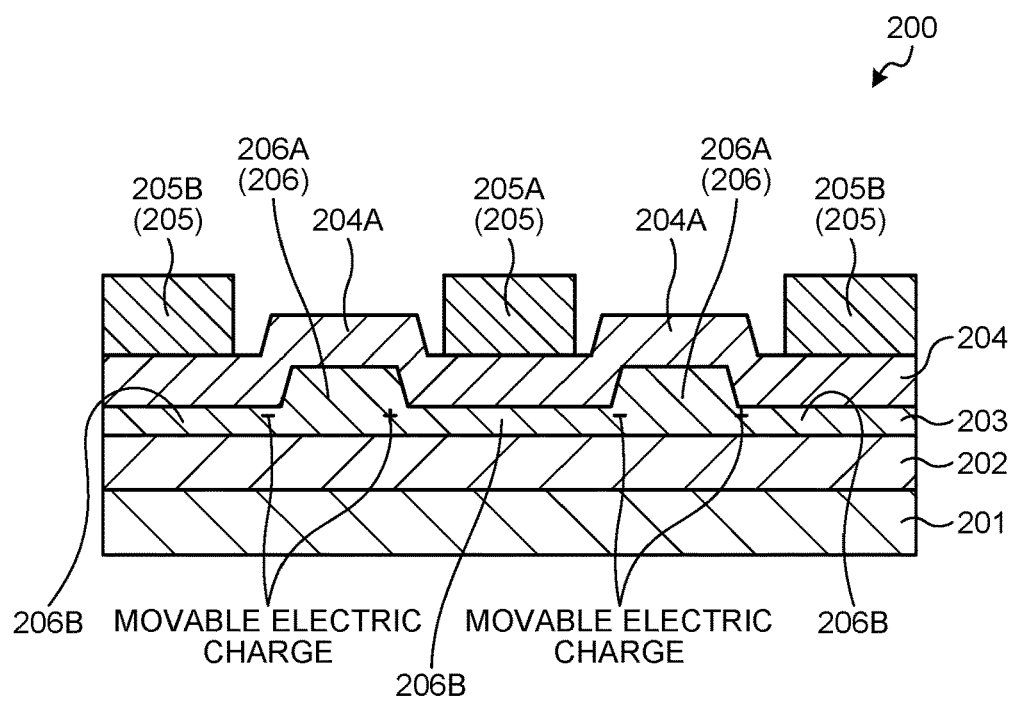
FIG. 12 is a schematic cross-sectional view illustrating an example of the DC modulating unit included in the conventional optical modulator.

FIG. 10 is a schematic plan view illustrating an example of a configuration of the optical modulator 5 according to the sixth embodiment. Furthermore, by assigning the same reference numerals to components having the same configuration as those in the optical modulator 5 according to the fifth embodiment, overlapped descriptions of the configuration and the operation thereof will be omitted. A RF modulating unit 12A illustrated in FIG. 10 is different from the RF modulating unit 12 illustrated in FIG. 9 in that the gettering site 71 that is disposed in parallel so as to sandwich the electrode 22 included in the RF modulating unit 12A is included. Furthermore, the opening portion 72 is formed, in each of the buffer layer 54 and the thin film LN substrate 53, at a position in which the gettering site 71 is disposed.

The gettering site 71 includes a first gettering site 71A2, the second gettering site 71B2, and a third gettering site 71C2. The opening portion 72 includes a first opening portion 72A2, a second opening portion 72B2, and a third opening portion 72C2.

The first gettering site 71A2 drifts the movable electric charge inside the thin film LN substrate 53 due to the internal electric field existing inside the thin film LN crystal produced by a heat treatment. The first gettering site 71A2 traps the movable electric charge on the positive side remaining inside the thin film LN substrate 53 included in the DC modulating unit 13 by a drift of the movable electric charge, and also, traps the movable electric charge on the positive side remaining inside the thin film LN substrate 53 included in the RF modulating unit 12A. The first opening portion 72A2 is formed, in the buffer layer 54, the thin film LN substrate 53, and the intermediate layer 52, at a position in which the first gettering site 71A2 is disposed, and on which the first gettering site 71A2 is laminated. Furthermore, the first joining unit X1 included in the first gettering site 71A2 is engaged with the second joining unit X2 included in the buffer layer 54, the thin film LN substrate 53, and the intermediate layer 52 on the first opening portion 72A side, so that the first gettering site 71A2 is directly brought into contact with the thin film LN substrate 53.

The second gettering site 71B2 drifts the movable electric charge that is present inside the thin film LN substrate 53 due to the internal electric field existing in the thin film LN crystal produced by a heat treatment. The second gettering site 71B2 traps the movable electric charge on the negative side remaining inside the thin film LN substrate 53 included in the DC modulating unit 13 by a drift of the movable electric charge. The second opening portion 72B2 is formed, in the buffer layer 54, the thin film LN substrate 53, and the intermediate layer 52, at a position in which the second gettering site 71B2 is disposed, and on which the second gettering site 71B2 is laminated. Furthermore, the first joining unit X1 included in the second gettering site 71B2 is engaged with the second joining unit X2 included in the buffer layer 54, the thin film LN substrate 53, and the intermediate layer 52 on the second opening portion 72B side, so that the second gettering site 71B2 is directly brought into contact with the thin film LN substrate 53.

The third gettering site 71C2 drifts the movable electric charge that is present inside the thin film LN substrate 53 due to the internal electric field in the thin film LN crystal produced by a heat treatment. The third gettering site 71C2 traps the movable electric charge on the negative side remaining inside the thin film LN substrate 53 included in the RF modulating unit 12A by a drift of the movable electric charge. The third opening portion 72C2 is formed, in the buffer layer 54, the thin film LN substrate 53, and the intermediate layer 52, at a position in which the third gettering site 71C2 is disposed, and on which the third gettering site 71C2 is laminated. Furthermore, the first joining unit X1 included in the third gettering site 71C2 is engaged with the second joining unit X2 included in the buffer layer 54, the thin film LN substrate 53, and the intermediate layer 52 on a third opening portion 72C side, so that the third gettering site 71C2 is directly brought into contact with the thin film LN substrate 53.

The first gettering site 71A2 traps the movable electric charge on the positive side that is present inside the thin film LN crystal in the thin film LN substrate 53 included in the RF modulating unit 12A. As a result, the movable electric charge on the positive side is removed from the rib 60A included in the thin film optical waveguide 60 corresponding to the thin film LN substrate 53 included in the RF modulating unit 12A. The third gettering site 71C2 traps the movable electric charge on the negative side that is present inside the thin film LN crystal in the thin film LN substrate 53 included in the RF modulating unit 12A. As a result, the movable electric charge on the negative side is removed from the rib 60A included in the thin film optical waveguide 60 corresponding to the thin film LN substrate 53 included in the RF modulating unit 12A.

In the RF modulating unit 12A according to the sixth embodiment, the movable electric charge that is present inside the thin film LN crystal in the thin film LN substrate 53 is trapped by using the first gettering site 71A2 and the third gettering site 71C2. As a result, in the RF modulating unit 12A, the movable electric charge is removed from the rib 60A included in the thin film optical waveguide 60 corresponding to the thin film LN substrate 53. It is possible to stabilize the electric field that is present in the thin film optical waveguide 60, so that it is possible to extend the life of the RF modulating unit 12A. As a result, it is possible to stabilize the DC characteristics and prevent an occurrence of a DC drift. In addition, it is possible to extend the life of In the RF modulating unit 12A, instead of the heat treatment, the movable electric charge remaining inside the thin film LN substrate 53 may be trapped in accordance with the electric conduction with respect to the first gettering site 71A1 and the third gettering site 71C2, and appropriate modifications are possible. In this case, there is no need to rely on the drift of the movable electric charge of the thin film LN substrate 53 due to the internal electric field of the thin film LN crystal, and furthermore, in the case where the drift of the movable electric charge that is present inside the thin film LN substrate 53 due to the internal electric field is used, it is possible to further improve the trap efficiency of the movable electric charge.

According to an aspect of an embodiment of the optical device or the like disclosed in the present application, it is possible to stabilize an electric field that is present in an optical waveguide.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
   an optical waveguide that is a rib type and that is formed of a thin film lithium niobate ($LiNbO_3$: LN) substrate using a thin film LN crystal;
   a buffer layer that is laminated on the optical waveguide;
   an electrode that is laminated on the buffer layer and that applies a voltage to the optical waveguide; and
   a gettering site that is disposed parallel to the optical waveguide and that traps an electric charge inside the optical waveguide.

2. The optical device according to claim 1, wherein
   the electrode is a direct current (DC) electrode, and
   two gettering sites are disposed in parallel so as to sandwich the DC electrode, one of two gettering sites being a first gettering site that traps a positive electric charge present in the optical waveguide, and the other of two gettering sites being a second gettering site that traps a negative electric charge present in the optical waveguide.

3. The optical device according to claim 1, wherein the gettering site is disposed in a Z-axis direction of orientation of the thin film LN crystal of the optical waveguide.

4. The optical device according to claim 1, further comprising:
   an opening portion that is opened in the buffer layer and the thin film LN substrate that are located below a position in which the gettering site is disposed, wherein the gettering site is laminated in the opening portion.

5. The optical device according to claim 4, wherein the thin film LN substrate that is exposed on the opening portion side is structured to have substantially a same thickness as a rib included in the optical waveguide corresponding to the thin film LN substrate.

6. The optical device according to claim 4, further comprising:
   a first joining unit that has a comb tooth shape and that is included in the gettering site; and
   a second joining unit that is formed on the thin film LN substrate and the buffer layer on the opening portion side, that is joined to the first joining unit, and that has a comb tooth shape, wherein
   a portion between the gettering site and the thin film LN substrate are joined as a result of the first joining unit being engaged with the second joining unit.

7. The optical device according to claim 4, further comprising:
   a first joining unit that has a saw tooth shape and that is included in the gettering site; and
   a second joining unit that is formed on the thin film LN substrate and the buffer layer on the opening portion side, that is joined to the first joining unit, and that has a saw tooth shape, wherein
   a portion between the gettering site and the thin film LN substrate are joined as a result of the first joining unit being engaged with the second joining unit.

8. The optical device according to claim 1, wherein
   the electrode is a radio frequency (RF) electrode, and
   two gettering sites are disposed in parallel so as to sandwich the RF electrode, one of two gettering sites being a first gettering site that traps a positive electric charge present in the optical waveguide, and the other of two gettering sites being a third gettering site that traps a negative electric charge present in the optical waveguide.

9. The optical device according to claim 1, wherein the gettering site is formed of a material including polysilicon.

10. The optical device according to claim 1, wherein the gettering site is formed of a material including silicon nitride.

11. An optical communication apparatus comprising:
    a processor that executes signal processing on an electrical signal;
    a light source that emits light; and
    an optical device that modulates, by using the electrical signal output from the processor, the light emitted from the light source, wherein
    the optical device includes
       an optical waveguide that is a rib type and that is formed of a thin film lithium niobate ($LiNbO_3$: LN) substrate using a thin film LN crystal;
       a buffer layer that is laminated on the optical waveguide;
       an electrode that is laminated on the buffer layer and that applies a voltage to the optical waveguide; and
       a gettering site that is disposed parallel to the optical waveguide and that traps an electric charge inside the optical waveguide.

* * * * *